Patented Sept. 6, 1949

2,481,105

UNITED STATES PATENT OFFICE 2,481,105

SULFA-DRUGS AND METHODS FOR THEIR PRODUCTION

Paul Goedrich, Newark, N. J.; Louise Marie Goedrich executrix of said Paul Goedrich, deceased No Drawing. Application August 31, 1943, Serial No. 500,686

7 Claims. (Cl. 260—239.6)

This application relates to certain new and useful improvements in sulfa-drugs and to methods for their production.

The term "sulfa-drugs" is used herein to designate the group of sulfonamide chemotherapeutic agents embracing sulfanilamide and its derivatives, such as sulfapyridine, sulfathiazole, sulfapyrazine, sulfaguanidine, sulfadiazine, and the like, including their salts and substitutive products such as, for instance, sulfanilamide phosphate, sulfa-methyldiazines, etc.

The chemo-therapeutic merits of these sulfonamides, when administered per os or by injection, in combatting certain types of infections, are well established, but their positive utility for topical application in the treatment of wounds is controversial. It appears to be established that certain strains of streptococcus, staphylococcus, and pneumococcus are resistant to them, and that the indiscriminate use of one or another sulfa-drug is still empiric and the results, at best, of a hit or miss order.

Various investigators have found that the sulfa-drugs are not self-sterilizing and that spore contamination of them is possible, so that it has even been recommended that the sulfonamides be sterilized before being used in open wounds.

The effectiveness of the sulfonamides has also been reported to be materially reduced against bacteria in areas with tissue necrosis and purulent exudates containing peptone.

It is an immediate object of the present work to produce improvements in, and modifications of, the sulfonamide drugs, more especially for topical applications as vulneraries, whereby the antibacterial potency would be extended and rendered more positive and less selective in antibacterial activity. Such a remedy should be effective in the presence of organic matter.

It has now been found that, by suitable treatment of these sulfa-drugs with iodine, a series of products can be obtained which have enhanced antibacterial activity and are more positive in their action. By such treatment, two types of products, are obtained. One of these consists of spore-killing sulfa-iodine compounds, the other, of correlative iodine-activated, but iodine-free sulfa-compounds which have inhibitive and sometimes even bactericidal properties, beyond the potency of the untreated drugs.

In general, the methods for treating such drugs according to the instant application, as to one effective process, comprises mixing together a given selected sulfa-drug with elemental iodine, heating the mixture until it is thoroughly amalgamated, thereafter digesting the mixture with alcohol, or other suitable medium, and then separating the resulting solution from the undissolved portion, preferably by filtration.

The two fractions thus obtained may, for convenience of reference, be designated, respectively, as "A" for the iodized alcoholic extract, and as "B" for the undissolved extraction residue which is iodine-free.

The separated alcoholic solution (fraction "A") is evaporated to dryness, and, as occasion may require, treated with a selective solvent for free iodine, such as petroleum ether, so as to remove any excess of "unattached" or free elemental iodine.

The undissolved residue (fraction "B"), which is already substantially freed from iodine, may then nevertheless be washed with alcohol, or a solvent of similar function, to remove any iodine still adhering to the residual sulfa-drug from the previous operations.

After the indicated treatments, the product "A" consists, in the main, of an alcohol soluble fraction of the sulfa-drug together with adsorbed iodine; whereas the product "B" consists essentially of the residue after the alcoholic extraction from the iodine-treated sulfa-drug mixture but is substantially free from iodine.

The sulfa-drug factor of both of these fractions "A" and "B", derived in the manner indicated, both appear to retain the gross physical and chemical characteristics of sulfa-drugs according to the U. S. P. method of assay, although it is evident that some chemical change must have resulted. The nature of this change is not as yet fully understood.

Products of type "A", after complete removal of all eventual excess of free elemental iodine with petroleum ether, and after the removal of all titratable iodine with sodium thiosulphate, followed by washing with water, give no indication of the presence of any organically combined iodine. It thus appears that the iodine content of type "A" products is present in the adsorbed form, whatever change may have taken place in the structure of the sulfa-drug constituent.

It is surprising to find that the products of type "B," which have been freed from all iodine, and without any apparent change in their general chemical nature as sulfa-drugs also exhibit decidedly enhanced bacteriological activity in vitro as compared with the corresponding untreated sulfa-drugs.

The products of type "A," carrying adsorbed iodine, show even relatively more pronounced anti-bacterial action, yet tests carried out with the latter do not exhibit the usual untoward escharotic or necrotic effects on animal tissue often resulting from the application of free elemental iodine.

The following charts illustrate some of the bacteriological laboratory results obtained in vitro with some of the compounds of types "A" and "B" on various organisms in selected media.

Chart I

*This chart indicates the in-vitro germicidal effects of sulfonamide-iodine compounds*

[Test organism: *Staphylococcus aureus*. Media: Veal brain agar.]

| Sulfonamide-iodine compound | Effect on organism [1] | Result of subculture | Remark |
|---|---|---|---|
| Sulfanilamide-Iodine | 30 | — | germicidal. |
| Sulfathiazole-Iodine | 40 | — | Do. |
| Phosphate of Sulfanilamide-Iodine | 30 | — | germicidal. (very good diffusion.) |
| Sulfamethyldiazine-Iodine | 30 | — | germicidal. |
| Sulfapyrazine-Iodine | 10 | — | Do. |
| Sulfaguanidine-Iodine | 35–40 | — | Do. |
| Sulfapyridine-Iodine | 15 | — | Do. |
| Sulfathizaole-Alcohol-soluble part. | 20 | — | Do. |

[1] Zone of no bacterial growth expressed in mm.
Explanation: —No growth of bacteria; +Growth of bacteria.

Chart II

*This chart indicates the inhibitive action of "iodine-activated but iodine-free" sulfonamides*

[Test organism: *Staphylococcus aureus*; Media: Veal brain agar.]

| "Iodine-activated but iodine-free" sulfas | Effect on organism [1] | Result of sub-cultures | Remark |
|---|---|---|---|
| Sulfanilamide-Residue, Iodine-free. | 10 | + | Inhibitive. |
| Sulfathiazole-Residue, Iodine-free. | 20 | + | Do. |
| Sulfapyrazine-Residue, Iodine-free. | 7 | — | Germ killing. |
| Sulfadiazine-Residue, Iodine-free. | 5 | — | Do. |

[1] Zone of no bacterial growth expressed in mm.

Chart III

*This chart indicates the action of sulfonamide-iodine compounds on anaerobic, sporebearing organisms*

[Media: Fluid thioglycollate (Linden) with added agar.]

| Sulfonamide-Iodine Compound | Organism | Effect on Organism [1] | Result of Subculture |
|---|---|---|---|
| Sulfathiazole-Iodine | Tetanus | 15 | — |
| Do | Welchii | 12 | — |
| Sodium Sulfapyrazine-Iodine | Tetanus | 15 | — |
| Do | Welchii | 18 | — |
| Sulfanilamide-Iodine | Tetanus | 12 | — |
| Do | Welchii | 16 | — |
| Sulfamethyldiazine-Iodine | Tetanus | 20 | — |
| Do | Welchii | 12 | — |
| Sulfadiazine-Iodine | Tetanus | 10 | — |
| Sulfapyridine-Iodine | do | 5 | — |
| Sulfathiazole-alcohol-soluble part. | Tetanus | 20 | — |
| Do | Welchii | 18–20 | — |

[1] Zone of no bacterial growth expressed in mm.
Explanation: —No growth of bacteria; + Growth of bacteria.

Chart IV

*This chart indicates the action of sulfonamide-iodine compounds on aerobic, sporebearing organisms*

| Sulfonamide-Iodine Compound | Organism | Effect on Organism [1] | Result of Subculture |
|---|---|---|---|
| Sulfathiazole-Iodine | Anthrax | 20 | — |
| Do | B. Subtilis | 20–25 | — |
| Sulfadiazine-Iodine | Anthrax | 15 | — |
| Sulfamethyl-diazine-Iodine | do | 10 | — |

[1] Zone of no bacterial growth expressed in mm.
Explanation: —No growth of bacteria; + Growth of bacteria.

The following examples will serve to explain preferred methods for attaining the results described herein with a number of the better-known and characteristic sulfa-drugs. These are presented for the purpose of illustration, and not by way of limitation, as it will be obvious to those skilled in the art that certain modifications may be made as to the sulfa-drugs employed, in the choice of selective solvents, the order of steps, omission of steps, and the like, without departing from the spirit and scope or the essentials of the invention herein disclosed.

Example I

*Sulfanilamide.*—An intimate mixture is made of 20 grammes of sulfanilamide with 3 grammes of powdered iodine. The mixture is heated moderately until there is thorough amalgamation and until repeated occasional testing of small amounts of the mass by shaking with petroleum ether show no or but slight discoloration. The temperature employed may be conveniently maintained at say from 40 to 80° C. No precise temperature control is essential except within the limits of ordinary laboratory caution. After cooling the mixture is ground to break up any lumps that may have formed.

This product of the thermal interaction of the sulfonamide and the iodine is then digested in 200 c. c. of 95% alcohol whereafter the undissolved portion is removed by filtration and the residue freed from any adherent iodine by washing. The alcoholic solution is evaporated to dryness. The dry precipitate may then be extracted with petroleum ether, or other solvent of similar properties, to wash out any remaining free elemental iodine. The remaining product "A" appears as a dark brown powder.

The undissolved residue remaining after the alcoholic extraction (product "B") is then also washed to remove all iodine that may still be adherent. It appears as a white powder, and responds to the U. S. P. assay for the characterization of sulfa drugs.

Example II

*Sulfathiazole.*—42 grammes of sulfathiazole are triturated with 7 grammes of iodine until an even mixture is obtained. This is heated to a temperature of about 80° C. maintained for about 18 hours. A dark brown powder is obtained.

(This substance was tested according to F. D. A. procedure against *Staphylococcus aureus, B. subtilis, B. tetani* (spores), *B. Welchii* (spores), *B. anthracis* (spores), and was found to have a definite germicidal action against these organisms.)

The foregoing preparation was extracted with 95% U. S. P. alcohol. A dark brown solution was obtained. The alcohol insoluble residue was removed by filtration, and the alcoholic solution evaporated to dryness—a dark brown substance resulted, which did not show any appreciable iodine coloration when extracted with petroleum ether. (When tested bacteriologically against the organisms above mentioned, it showed the same germicidal effects.)

The alcohol insoluble residue, which had been removed after the alcohol extraction as above described, was then washed, first with alcohol, then with solution of sodium thiosulfate, followed by a washing in distilled water. After drying a yellowish powder was obtained.

This last compound (type "B"), when tested bacteriologically exhibited inhibitory in vitro action against sporebearing as well as non-sporebearing organisms, whereas untreated sulfathiazole has no such inhibitory action.

Example III

*Sulfadiazine.*—10 grammes of sulfadiazine, are titurated in a mortar with 0.1 grammes of iodine, a small quantity of carbon disulfide (CS$_2$) was added and the mixture titurated again until dry. The substance, in a tightly closed container, was exposed to 50° C. for 14 hours. After this period the substance was allowed to cool. A pinkish preparation was obtained. When the alcohol-soluble fraction was removed, the remaining substance was found to be free from adsorbed and combined iodine. When fused the odors of aniline, ammonia, and hydrogen sulfide were distinctly noticeable.

Example IV

*Sulfanilamide.*—5 grammes of iodine were dissolved in 350 c. c. of alcohol 95%, then 40 grammes of sulfanilamide were added. This solution was boiled in a glass flask, connected with a reflux condenser, for 4 hours. The liquid part was removed under vacuum. A brown crystalline substance was obtained. This substance is soluble in ethelene glycol, in alcohol, and also partly soluble in water, and showed a highly germicidal and sporicidal action. When this substance was extracted until no starch-iodine reaction could be observed, it was found to be free from combined iodine. The alcohol soluble part, containing adsorbed iodine showed a high germicidal action.

The same methods of treatment have been found to be applicable to a range of well known sulfonamide derivatives for obtaining a variety of products both of types "A" and "B", as for instance, sulfonanilamide, sulfonanilamide phosphate, sulfapyridine, sulfaguanidine, sulfadiazine, sulfa-methyldiazine, sulfapyrazine and sulfathiazole to mention only the currently most prominent.

As will be obvious from the foregoing disclosures, it is possible, within self-evident limits, to control the relative amounts of type "A" and type "B" production by appropriately adapting the quantities of the ingredients either up to or reasonably below the maximum limit of iodine adsorption, and by adjusting the relative amount or dilution of the extracting alcohol as can be readily determined from the exemplifications hereinbefore presented.

The different sulfa-drugs vary somewhat with respect to the total amount of iodine which can be taken up by them in the manner described. Since adsorption compounds do not follow stoichiometric rules, more or less iodine may be employed, however with avoidance of any excess which would result in the presence of appreciable free iodine in the complete type "A" products. Such excess can always be avoided by shaking with petroleum ether or other selective solvents for free iodine adventitious excess, and thus the specific limit for iodine adsorption as to each new sulfa-drug can be readily ascertained by small scale determinations in advance. When it is desired, for instance to produce such sulfa-iodine compounds as of type "A" with a maximum of iodine content, this can readily be determined by the method of extraction with petroleum ether to determine when the point of saturation has been attained.

The undissolved iodine-free residue, filtered out from the alcoholic solution of the sulfa-iodine composition, consists of the given sulfa-drug put into process, apparently substantially unchanged as to its gross characteristics, such as melting points, etc., but there has been some modification. Thus the modified drug has become non-luminescent under ultra-violet rays and it has acquired material enhanced antibacterial activity.

I claim:

1. The process of producing new iodine addition compounds of a member of the group consisting of sulfanilamide, 2-sulfanilylamido-pyridine, 2-sulfanilylamido-pyrimidine, and 2-sulfanilylamido-thiazole, which comprises the steps of intimately mixing crystalline iodine with such a member, heating the mixture until substantially no further fumes of iodine are emitted from the heated mixture, then digesting the thermal reaction product in strong alcohol, separating the alcoholic solution thus obtained from any undissolved residue by filtration, and evaporating the filtrate to dryness.

2. The process of claim 1, as applied to sulfanilamide.

3. The process of claim 1, as applied to 2-sulfanilylamido-pyrimidine.

4. The iodine-containing compound which is obtained by treating sulfanilamide according to the method of claim 1.

5. The iodine-containing compound which is obtained by treating 2-sulfanilylamido-pyrimidine according to the method of claim 1.

6. The process of claim 1, as applied to 2-sulfanilylamido-thiazole.

7. The iodine-containing compound which is obtained by treating 2-sulfanilylamido-thiazole according to the method of claim 1.

PAUL GOEDRICH.

REFERENCES CITED

The following references are of record in the file of this patent:

UNITED STATES PATENTS

| Number | Name | Date |
|---|---|---|
| 2,186,773 | Stuart | Jan. 9, 1940 |
| 2,328,455 | Hultquist | Aug. 31, 1943 |

FOREIGN PATENTS

| Number | Country | Date |
|---|---|---|
| 850,553 | France | Sept. 18, 1939 |

OTHER REFERENCES

Scudi: Journal Amer. Chem. Soc., Aug. 1937, pp. 1480–1482.

Chem. Abstracts, vol. 35, page 2121 (1941).

American Journal Surgery, vol. 56, pp. 353–374 (1942).

Goedrich: Drug, Vitamin, and Allied Industries, vol. 32, pp. 9–11 (1946).